United States Patent
Baik et al.

(10) Patent No.: US 11,283,157 B2
(45) Date of Patent: Mar. 22, 2022

(54) DISPLAY MODULE AND METHOD OF MANUFACTURING THE SAME

(71) Applicant: Samsung Electronics Co., Ltd., Suwon-si (KR)

(72) Inventors: Chul Baik, Suwon-si (KR); Yong Uk Lee, Gwangju-si (KR); Eung Yeoul Yoon, Suwon-si (KR); Dong Hyun Sohn, Hwaseong-si (KR); Nak Hyun Kim, Suwon-si (KR); Byung Ha Park, Suwon-si (KR); Joon-Young Choi, Hwaseong-si (KR); Won Bin Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/793,297

(22) Filed: Feb. 18, 2020

(65) Prior Publication Data
US 2020/0203809 A1   Jun. 25, 2020

Related U.S. Application Data

(63) Continuation of application No. 14/977,900, filed on Dec. 22, 2015, now Pat. No. 10,573,955.
(Continued)

(30) Foreign Application Priority Data

Oct. 2, 2015   (KR) .......................... 10-2015-0138949

(51) Int. Cl.
*H01Q 1/24*   (2006.01)
*G04G 21/04*   (2013.01)
(Continued)

(52) U.S. Cl.
CPC ............. *H01Q 1/243* (2013.01); *G04G 21/04* (2013.01); *G04G 21/08* (2013.01); *G06F 1/163* (2013.01);
(Continued)

(58) Field of Classification Search
CPC .......... H01Q 1/243; H01Q 1/36; H01Q 1/273; H01Q 1/44; G04G 21/08; G04G 21/04; G06F 1/163; G06F 1/1637
See application file for complete search history.

(56) References Cited

U.S. PATENT DOCUMENTS 7,289,066 B2 * 10/2007 Homolle ............... H01Q 1/2208
                                                         343/700 MS
2010/0026590 A1 * 2/2010 Chiang .................... H01Q 1/36
                                                         343/702

(Continued)

FOREIGN PATENT DOCUMENTS

CN   102244315   11/2011
CN   102983410   3/2013

(Continued)

OTHER PUBLICATIONS

Chinese Office Action dated Apr. 10, 2020 in Chinese Patent Application No. 201580080243.3.
(Continued)

*Primary Examiner* — Awat M Salih
(74) *Attorney, Agent, or Firm* — Staas & Halsey, LLP

(57) ABSTRACT

A display module configured to improve transmission and reception performance of an electronic device includes: a first panel; a second panel disposed to be opposite to the first panel; and an antenna layer disposed between the first panel and the second panel, and comprising a resin layer formed by an imprinting method, wherein the resin layer includes: an engraved pattern formed in one surface; and an ink layer
(Continued)

formed with a conductive material filled in the engraved pattern.

19 Claims, 21 Drawing Sheets

Related U.S. Application Data

(60) Provisional application No. 62/165,279, filed on May 22, 2015.

(51) Int. Cl.
    *G04G 21/08*     (2010.01)
    *G06F 1/16*     (2006.01)
    *H01Q 1/27*     (2006.01)
    *H01Q 1/36*     (2006.01)
    *H01Q 1/44*     (2006.01)

(52) U.S. Cl.
    CPC .......... *G06F 1/1637* (2013.01); *H01Q 1/273* (2013.01); *H01Q 1/36* (2013.01); *H01Q 1/44* (2013.01)

(56) References Cited

U.S. PATENT DOCUMENTS

| | | | |
|---|---|---|---|
| 2011/0102292 A1 | 5/2011 | Xiong | |
| 2013/0078917 A1 | 3/2013 | Cho | |
| 2014/0106684 A1 | 4/2014 | Burns et al. | |
| 2014/0232609 A1 | 8/2014 | Lee | |
| 2014/0251662 A1* | 9/2014 | Rotto | ............ H05K 1/0274 977/932 |
| 2014/0293162 A1 | 10/2014 | Park et al. | |
| 2015/0068787 A1 | 3/2015 | Chung | |
| 2016/0349883 A1 | 12/2016 | Kiyoto | |
| 2017/0052639 A1* | 2/2017 | Kobayashi | .......... G06F 3/04164 |
| 2017/0228071 A1* | 8/2017 | Yoon | ..................... G06F 3/0443 |

FOREIGN PATENT DOCUMENTS

| | | |
|---|---|---|
| CN | 103732709 | 4/2014 |
| CN | 104169213 | 11/2014 |
| CN | 104530832 | 4/2015 |
| JP | 2011-91788 | 5/2011 |
| JP | 2012-89782 | 5/2012 |
| JP | 2013-5013 | 1/2013 |
| JP | 2014-212211 | 11/2014 |
| JP | 2015-41021 | 3/2015 |
| KR | 10-2014-0064842 | 5/2014 |

OTHER PUBLICATIONS

Australian Office Action dated Aug. 21, 2020 in Australian Patent Application No. 2015396104.
Japanese Office Action dated Jan. 14, 2020 in Japanese Patent Application No. 2017-560776.
International Search Report dated Mar. 30, 2016 in International Patent Application No. PCT/KR2015/013848.
Extended European Search Report dated May 2, 2018 in European Patent Application No. 15893458.8.
European Office Communication dated Apr. 12, 2019 in European Patent Application No. 15893458.8.
Chinese Office Action dated Jul. 9, 2019 in Chinese Patent Application No. 201580080243.3.
US Restriction Requirement dated Nov. 9, 2017 in U.S. Appl. No. 14/977,900.
US Office Action dated Jan. 26, 2018 in U.S. Appl. No. 14/977,900.
US Office Action dated Jul. 20, 2018 in U.S. Appl. No. 14/977,900.
US Office Action dated Jan. 11, 2019 in U.S. Appl. No. 14/977,900.
US Office Action dated Jul. 8, 2019 in U.S. Appl. No. 14/977,900.
US Notice of Allowance dated Oct. 9, 2019 in U.S. Appl. No. 14/977,900.
U.S. Appl. No. 14/977,900, filed Dec. 22, 2015, Chul Baik, et al., Samsung Electronics Co., Ltd.
European Office Action dated Nov. 25, 2019 in European Patent Application No. 15893458.8.
Indian Office Action dated Jan. 28, 2021 from Indian Application No. 201717044592, 11 pages.
Extended European Search Report dated Mar. 1, 2021 from European Application No. 20213224.7, 9 pages.
Korean Office Action dated Sep. 28, 2021 from Korean Application No. 10-2015-0138949.
Canadian Office Action dated Jan. 10, 2022 from Canadian Application No. 2,985,167.

* cited by examiner

DISPLAY MODULE AND METHOD OF MANUFACTURING THE SAME

CROSS-REFERENCE TO RELATED APPLICATIONS

This application is a continuation application of U.S. patent application Ser. No. 14/977,900, filed on Dec. 22, 2015, which claims the benefit of U.S. Provisional Patent Application No. 62/165,279 filed on May 22, 2015 in the U.S. Patent and Trademark Office, and Korean Patent Application No. 10-2015-0138949, filed on Oct. 2, 2015 in the Korean Intellectual Property Office, the disclosures of which are incorporated herein by reference.

BACKGROUND

1. Field

Embodiments of the present disclosure relate to a display module configured to improve transmission and reception performance of an electronic device, and a method of manufacturing the display module.

2. Description of the Related Art

With development of electronic communication industries, electronic devices (for example, a mobile terminal, an electronic organizer, a display device, and so on) are becoming important for information transfer.

Generally, an electronic device includes a transmission and reception apparatus in order to ensure transmission and reception performance. Recently, with development of technologies, the transmission and reception apparatus is reduced in size, slimmed, and simplified.

In order to implement such a transmission and reception apparatus, an In-Mold Antenna (IMA), a Laser Direct Structuring (LDS) method, or a method of making grooves in a substrate, plating the grooves with a metal, and disposing the resultant substrate on the rear surface of an electronic device is used.

SUMMARY

Therefore, it is an aspect of the present disclosure to provide a display module in which a transparent antenna is installed, and a method of manufacturing the display module, and more particularly, to provide a display module including a transparent antenna formed by an imprinting method, and a method of manufacturing the display module.

It is an aspect of the present disclosure to provide a display module including a transparent antenna formed with a conductive ink, and a method of manufacturing the display module. More specifically, the transparent antenna may be formed with a conductive ink containing conductive particles of different sizes.

It is an aspect of the present disclosure to provide a display module including a blackened transparent antenna, and a method of manufacturing the display module.

Additional aspects of the disclosure will be set forth in part in the description which follows and, in part, will be obvious from the description, or may be learned by practice of the disclosure.

In accordance with an aspect of the present disclosure, a display module includes: a first panel; a second panel disposed to be opposite to the first panel; and an antenna layer disposed between the first panel and the second panel, and comprising a resin layer formed by an imprinting method, wherein the resin layer includes: an engraved pattern formed in one surface; and an ink layer formed with a conductive material filled in the engraved pattern.

The engraved pattern may have a mesh pattern.

The mesh pattern may have a width of 1 µm to 10 µm, a depth of 1 µm to 18.5 µm, and a pattern interval of 50 µm to 250 µm.

The antenna layer may be transparent.

The resin layer may be formed by applying a resin on a substrate, pressing the applied resin to form an engraved pattern in the form of a mesh, and applying a conductive ink in the engraved pattern.

The substrate may include at least one of the first panel, the second panel, and a separate substrate except for the first panel and the second panel.

The ink layer may be formed with a conductive ink containing the same kind of conductive particles.

The conductive particles may have the same size, different sizes, or different shapes.

The conductive particles may include at least one selected from a group including silver (Ag), copper (Cu), nickel (Ni), a silver (Ag)-lead (Pb) alloy, gold (Au), a gold (Au)-platinum (Pt) alloy, a copper (Cu)-Nickel (Ni) alloy, and tungsten (W).

The conductive ink may further include blackened particles.

The blackened particles may have a lower specific gravity than the conductive particles.

The blackened particles may include at least one selected from a group including carbon black, graphite, carbon nanotube, polyacetylene, polypyrrole, polyaniline, and polythiophene.

The first panel and the second panel may include at least one of a display panel, a touch panel, and a window cover.

The window cover may further include a window protection coating layer disposed to be opposite to the window cover, and the antenna layer may be disposed between the window protection coating layer and the window cover.

The display panel may include a plurality of panels including a polarizing panel, and the antenna layer may be disposed between the plurality of panels.

The display panel may include at least one of a Liquid Crystal Display (LCD), a reflective display, an E-ink display, a Passive Matrix Organic Light Emitting Diode (PM OLED) display, and an Active Matrix Organic Light Emitting Diode (AM OLED) display.

In accordance with an aspect of the present disclosure, a display module includes: a first panel; a second panel disposed to be opposite to the first panel; and an antenna layer disposed between the first panel and the second panel, wherein the antenna layer includes an ink layer formed with a conductive ink containing the same kind of conductive particles.

The ink layer may include a conductive material having the same size, or different sizes and different shapes.

The conductive material may include at least one selected from a group including silver (Ag), copper (Cu), nickel (Ni), a silver (Ag)-lead (Pb) alloy, gold (Au), a gold (Au)-platinum (Pt) alloy, a gold (Au)-lead (Pb) alloy, a copper (Cu)-Nickel (Ni) alloy, and tungsten (W).

The conductive material may further include a blackened material.

The blackened material may have a lower specific gravity than the conductive material.

The blackened material may include at least one selected from a group including carbon black, graphite, carbon nanotube, polyacetylene, polypyrrole, polyaniline, and polythiophene.

The first panel and the second panel may include at least one of a window protection coating layer, a display panel, a touch panel, and a window cover.

In accordance with an aspect of the present disclosure, a display module includes: a first panel; a second panel disposed to be opposite to the first panel; and an antenna layer disposed between the first panel and the second panel, wherein the antenna layer includes a blackened layer formed with the same kind of a conductive material and a blackened material having a lower specific gravity than the conductive material.

The blackened material may include at least one selected from a group including carbon black, graphite, carbon nanotube, polyacetylene, polypyrrole, polyaniline, and polythiophene.

The conductive material may have the same size, or different sizes and different shapes.

The conductive material may include at least one selected from a group including silver (Ag), copper (Cu), nickel (Ni), a silver (Ag)-lead (Pb) alloy, gold (Au), a gold (Au)-platinum (Pt) alloy, a gold (Au)-lead (Pb) alloy, a copper (Cu)-Nickel (Ni) alloy, and tungsten (W).

The first panel and the second panel may include at least one of a display panel, a touch panel, and a window cover.

In accordance with an aspect of the present disclosure, a display module includes: a first panel; a second panel disposed to be opposite to the first panel; and an antenna layer disposed between the first panel and the second panel, and comprising a resin layer formed in a mesh pattern by an imprinting method, wherein the resin layer includes: an engraved pattern formed in one surface; and a blackened layer formed with the same kind of a conductive material filled in the engraved pattern and a blackened material having a lower specific gravity than the conductive material.

The first panel and the second panel may include at least one selected from a group including a window protection coating layer, a window cover, a touch panel, and a display panel.

In accordance with an aspect of the present disclosure, a method of manufacturing a display module, the display module including a first panel and a second panel, the method includes: forming an antenna layer on one surface of the first panel using an imprinting method; and coupling the first panel with the second panel, wherein the forming of the antenna layer includes: applying a resin on the first panel; pressing the applied resin to form an engraved pattern; and applying a conductive ink in the engraved pattern to form an antenna layer.

The applying of the conductive ink may include applying a conductive ink containing the same kind of conductive particles.

The conductive particles may have the same size, different sizes, or different shapes.

The conductive particles may include at least one selected from a group including silver (Ag), copper (Cu), nickel (Ni), a silver (Ag)-lead (Pb) alloy, gold (Au), a gold (Au)-platinum (Pt) alloy, a gold (Au)-lead (Pb) alloy, a copper (Cu)-Nickel (Ni) alloy, and tungsten (W).

The conductive ink may further include blackened particles having a lower specific gravity than the conductive particles.

The blackened particles may include at least one selected from a group including carbon black, graphite, carbon nanotube, polyacetylene, polypyrrole, polyaniline, and polythiophene.

The first panel and the second panel may include at least one selected from a group including a window protection coating layer, a window cover, a touch panel, and a display panel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
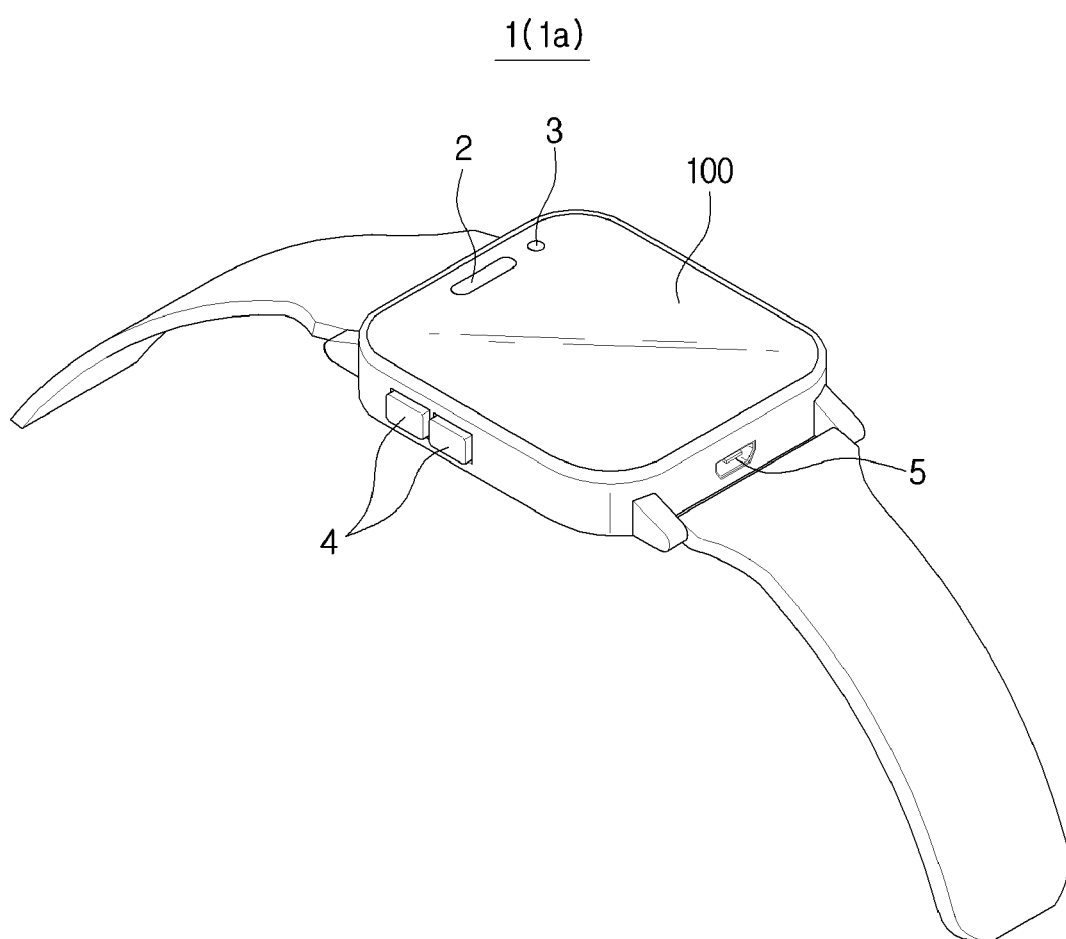
FIGS. 1A and 1B are perspective views of electronic devices according to embodiments of the present disclosure.

Reference will now be made in detail to the embodiments, examples of which are illustrated in the accompanying drawings, wherein like reference numerals refer to like elements throughout. The embodiments are described below to explain the present disclosure by referring to the figures.

Hereinafter, a display module, and a method of manufacturing the same will be described in detail with reference to the accompanying drawings.

A display module according to an embodiment of the present disclosure may be applied to various kinds of electronic devices. The electronic device may be an electronic device with a communication function. For example, the electronic device may be at least one of a smart phone, a tablet Personal Computer (PC), a mobile phone, a video phone, an e-Book reader, a desktop PC, a Personal Digital Assistant (PDA), a Portable Multimedia Player (PMP), an MPEG audio layer-3 (MP3) player, mobile medical equipment, a camera, or a wearable device (for example, a Head-Mounted-Device (HMD) such as electronic glasses, electronic clothes, an electronic bracelet, an electronic necklace, an electronic Appcessory, or a smart watch).

According to some embodiments, the electronic device may be a smart home appliance with a communication function. The smart home appliance may be at least one of a Television (TV), a Digital Versatile Disk (DVD) player, audio equipment, a refrigerator, an air conditioner, a cleaner, an oven, a microwave, a washing machine, an air cleaner, a set-top box, a TV box (for example, Samsung HomeSync™, Apple TV™, or Google TV™), game consoles, an electronic dictionary, a camcorder, or an electronic album.

According to some embodiments, the electronic device may be at least one of various medical equipment (for example, Magnetic Resonance Angiography (MRA), Magnetic Resonance Imaging (MRI), Computed Tomography (CT), medical camcorder, ultrasonic equipment, and the like), a navigation device, a Global Positioning System (GPS) receiver, an Event Data Recorder (EDR), a Flight Data Recorder (FDR), an automotive infotainment device, electronic equipment for a ship (for example, a marine navigation device, a gyro compass, and the like), avionics, or security equipment.

According to some embodiments, the electronic device may be at least one of furniture or part of building/structure with a communication function, an electronic board, an electronic signature receiving device, a projector, or various metering equipment (for example, water, electricity, gas, or waves metering equipment).

However, the electronic device that can adopt the display module according to an embodiment of the present disclosure is not limited to the aforementioned devices. Hereinafter, for convenience of description, the display module will be described in detail using a smart watch and a smart phone among the above-mentioned electronic devices as examples.

Figure 1B:
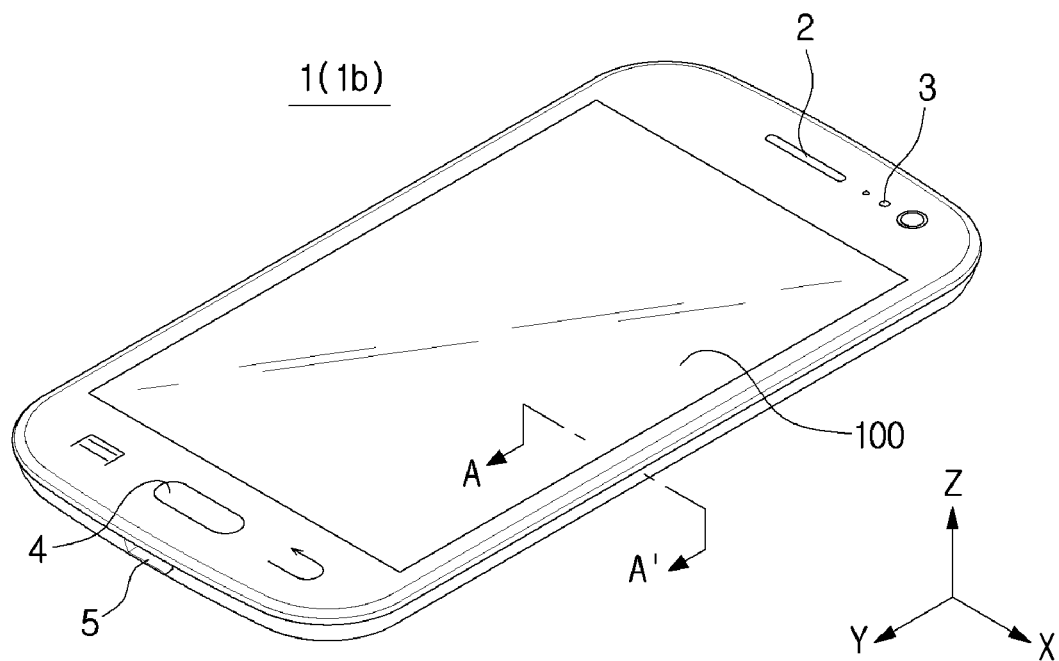

FIG. 1A is a perspective view of a smart watch which is an example of an electronic device according to an embodiment of the present disclosure, and FIG. 1B is a perspective view of a smart phone which is an example of an electronic device according to an embodiment of the present disclosure. As shown in FIGS. 1A and 1B, an electronic device 1 (more specifically, a smart watch 1a and a smart phone 1b) according to an embodiment of the present disclosure may include a display module 100, a speaker 2, at least one sensor 3, at least one key 4, and an external connector connecting jack 5.

The display module 100 may display images. The display module 100 may receive touch inputs. The display module 100 may include an antenna, and in this case, the antenna may be transparent in order to ensure visibility of the display module 100.

The speaker 2 may convert an electrical signal generated in the electronic device 1 into a sound signal to output sound.

The at least one sensor 3 may measure a physical quantity, sense an operation state of the electronic device 1, and convert the measured or sensed information into electrical signals. The at least one sensor 3 may include at least one of a gesture sensor, a proximity sensor, a grip sensor, a gyro sensor, an accelerometer, a geomagnetic sensor, a pressure sensor, a temperature/humidity sensor, a hall sensor, a RGB (Red, Green, Blue) sensor, an ambient light sensor, a biometric sensor, or an Ultra Violet (UV) sensor.

The key 4 may include a pressure key or a touch key. The key 4 may include a key to adjust volume, and a key to power the device on/off.

The external connector connecting jack 5 may be used as a High-Definition Multimedia Interface (HDMI), a Universal Serial Bus (USB), a projector, a port for connecting to a D-subminiature (D-sub) cable, or a charging port.

Hereinafter, the display module 100 will be described in more detail using the smart phone 1b which is an example of the electronic device 1 according to an embodiment of the present disclosure.

Figure 2:
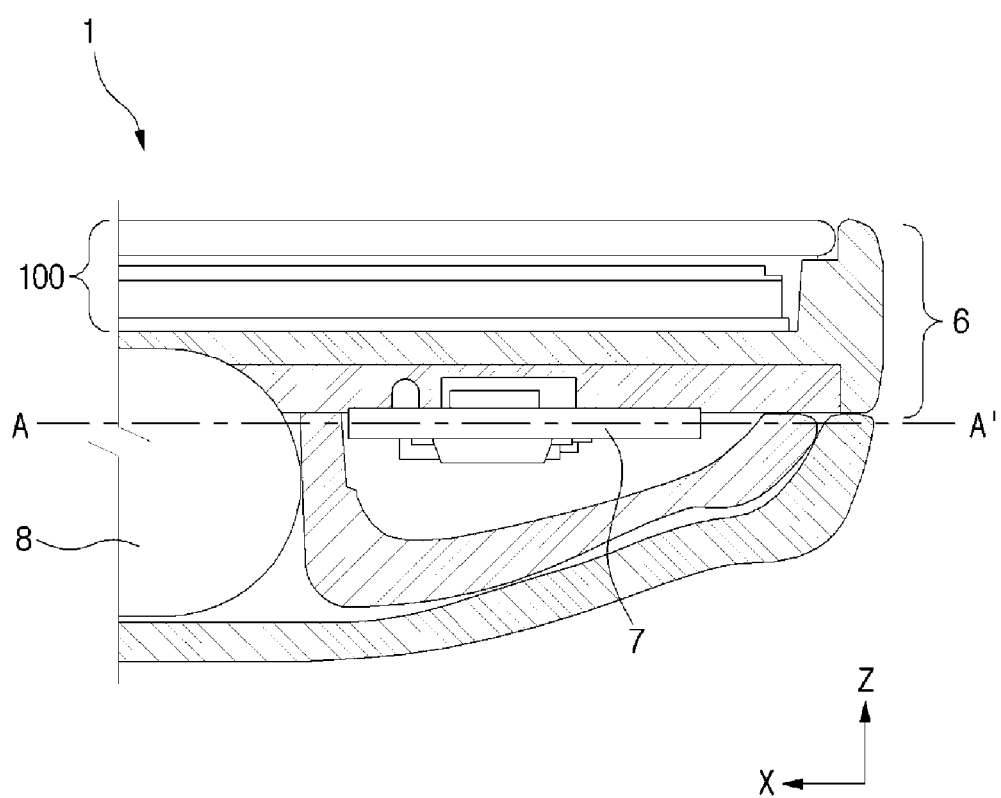
FIG. 2 is a cross-sectional view of the electronic device shown in FIG. 1B, cut along a line A-A'.
Figure 3A:
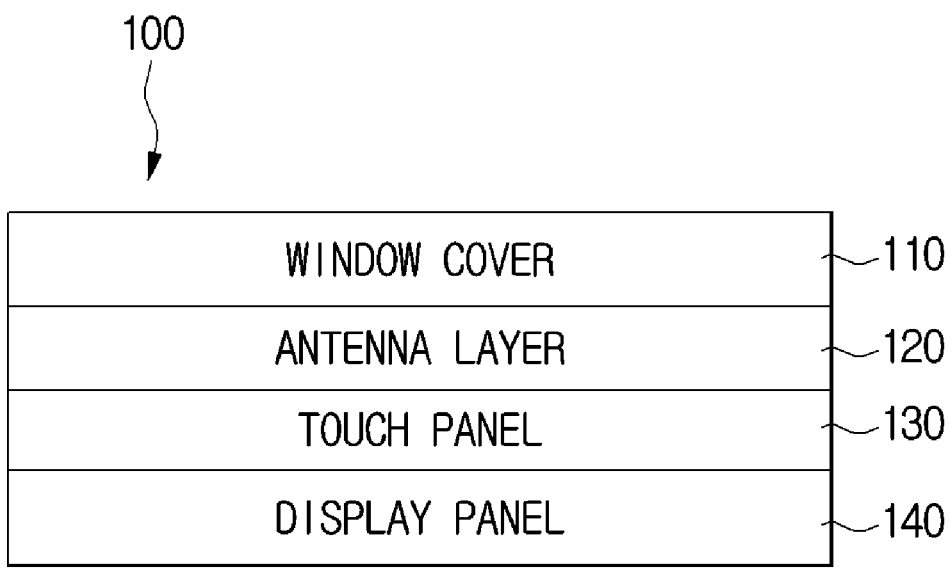
FIGS. 3A and 3B show examples of layered structures of a display module according to an embodiment of the present disclosure.
Figure 3B:
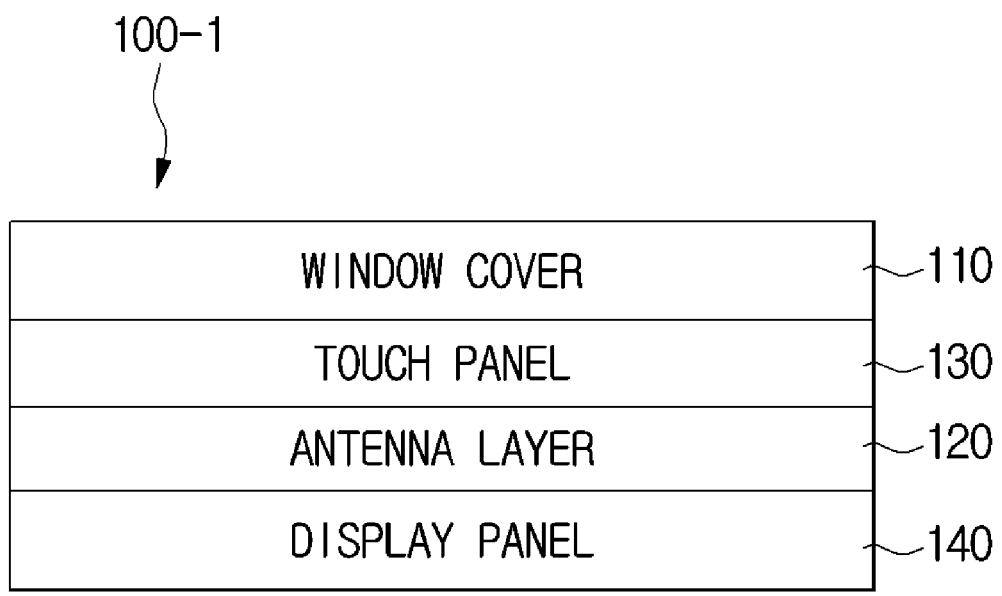

FIG. 2 is a cross-sectional view of the electronic device 1 (more specifically, the smart phone 1b) cut along a line A-A', according to an embodiment of the present disclosure, FIG. 3A shows a layered structure of the display module 100 according to an embodiment of the present disclosure, and FIG. 3B shows a layered structure of a display module according to an embodiment of the present disclosure.

As shown in FIG. 2, the electronic device 1 cut along the line A-A' may include the display module 100, a housing 6, a main circuit board 7, and a battery 8.

The display module 100 may include a first panel, a second panel that is opposite to the first panel, and an antenna layer disposed between the first panel and the second panel, which are layers to create images that are displayed on the electronic device 1. Herein, the first panel and the second panel may include at least one of a window cover, a touch panel, and a display panel. As shown in FIG. 3A, the display module 100 may have a structure in which a display panel 140, a touch panel 130, an antenna layer 120, and a window cover 110 are stacked in this order. However, the layered structure of the display module 100 is not limited to the structure shown in FIG. 3A, and a display module 100-1 according to an embodiment of the present disclosure may have a structure in which a display panel 140, an antenna layer 120, a touch panel 130, and a window cover 110 are stacked in the order as shown in FIG. 3B. Hereinafter, for convenience of description, it is assumed that the display module 100 has the structure shown in FIG. 3A.

The window cover 110 may be provided to protect the display module 100. The window cover 110 may be made of a transparent material with predetermined transmittance. The window cover 110 may be made of glass or a transparent plastic material having a uniform thickness and transmittance of a predetermined degree or more.

According to an embodiment, the window cover 110 may be tempered glass or thin-film glass into which a protection film is laminated. Alternatively, the window cover 110 may be a resin film. If the window cover 110 is a resin film, the window cover 110 may be made of polyethyleneTerephthalate (PET), polymethylmethacrylate (PMMA), acryl, polycarbonate (PC), polyimide (PI), polyethylene naphthalate (PEN), triacetate cellulose (TAC), polyether sulfone (PES), or the like.

When the window cover 110 is a resin film having flexibility, a thin, light-weight display module 100 can be implemented. Also, in this case, the display module 100 can be freely bent or flexed so that it can be applied to various kinds of devices based on design freedom.

The antenna layer 120, which is provided to ensure transmission and reception performance of the electronic device 1, may be below the window cover 110. The antenna layer 120 may have a metal mesh structure in order to ensure visibility of the display module 100.

One surface of the antenna layer 120 on which a mesh pattern is formed may be toward the front surface of the display module 100. According to an embodiment of the present disclosure, one surface of the antenna layer 120 on which a mesh pattern is formed may be toward the back surface of the display module 100. Hereinafter, one surface of the electronic device 1 on which images are displayed is defined as a front surface, and the other surface of the electronic device 1 is defined as a back surface.

The visibility and conductivity of the display module 100 may depend on how the mesh pattern of the antenna layer 120 is formed. Also, the conductivity of the display module 100 may depend on a kind of a conductive ink used to form the antenna layer 120. This will be described in more detail, later.

The touch panel 130 may be used to receive touch commands input from a user. The touch panel 130 may be below the antenna layer 120. However, the position of the touch panel 130 is not limited to this. Also, according to an embodiment of the present disclosure, one surface of the touch panel 130 may be coupled with an electronic writing sheet (for example, a digitizer).

The display panel 140, which is provided to display images, may be below the touch panel 130. The display panel 140 may be at least one of a Liquid Crystal Display (LCD), a reflective display, an E-ink display, a Passive Matrix Organic Light Emitting Diode (PM OLED) display, and an Active Matrix Organic Light Emitting Diode (AM OLED) display.

The housing 6 may include a bracket, a back case, and a battery cover.

The bracket may include an upper bracket and a lower bracket, and the lower bracket may be fixed at the lower part of the upper bracket. The bracket may be a mounting plate to fix and support a plurality of electronic components (for example, a communication module, a memory, a processor, an audio device, a speaker, a microphone, and the like).

The back case may be coupled with the bracket. The back case may be separated from the battery cover, or integrated into the battery cover.

The battery cover may be coupled with the back case to form the back of the electronic device 1. The battery cover may include a plurality of hooks at its edges, which are fastened with a plurality of hook fastening grooves of the back case.

The main circuit board 7 (see FIG. 2, for example, a main board or a mother board) may include a substrate on which a fundamental circuit and a plurality of electronic components are mounted. The main circuit board 7 may set an execution environment of the electronic device 1, and enable the electronic device 1 to stably operate. According to an embodiment, the main circuit board 7 may be electrically connected to the display module 100 to control the display module 100.

The basic structure of the display module 100 has been described above.

Hereinafter, a shape of the antenna layer 120 for ensuring transmission and reception performance of the display module 100 will be described in more detail.

Figure 4:
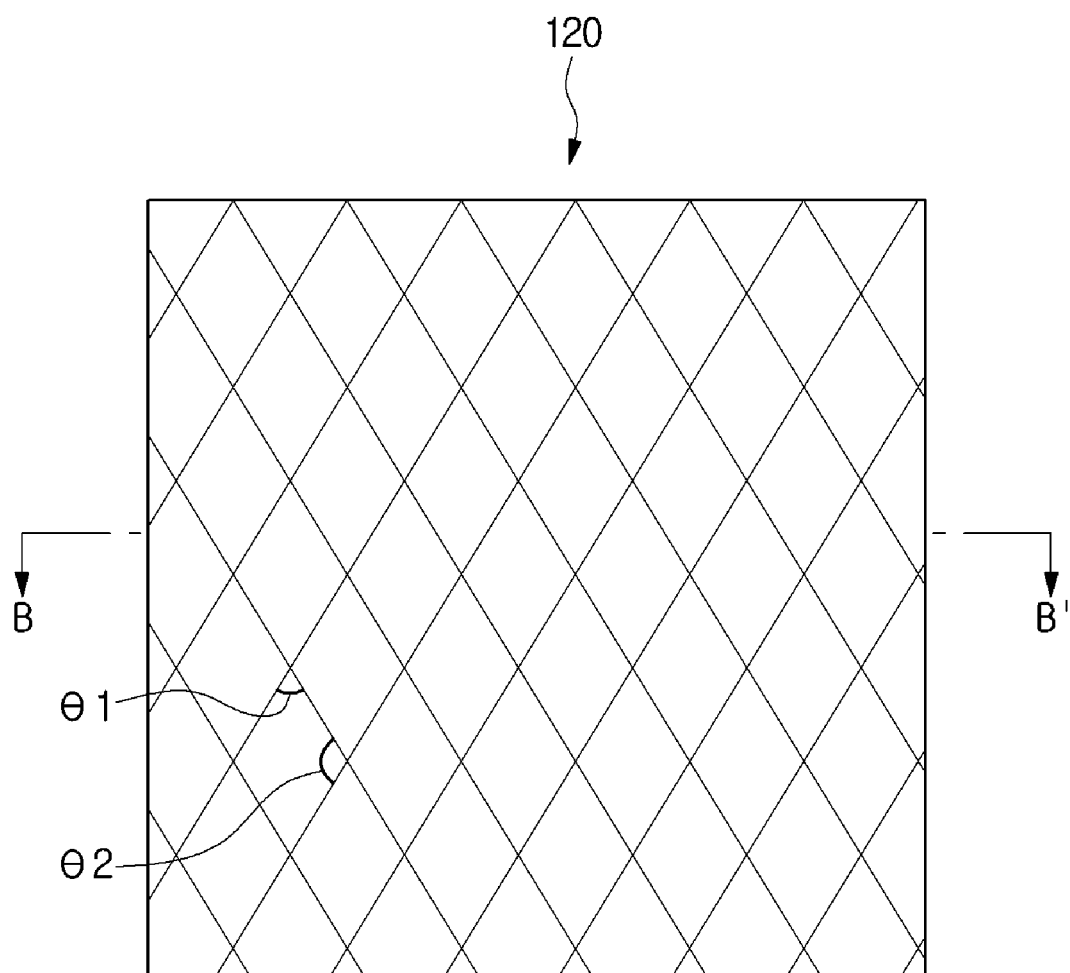
FIG. 4 shows an example of a mesh pattern formed in an antenna layer according to an embodiment of the present disclosure.
Figure 5A:
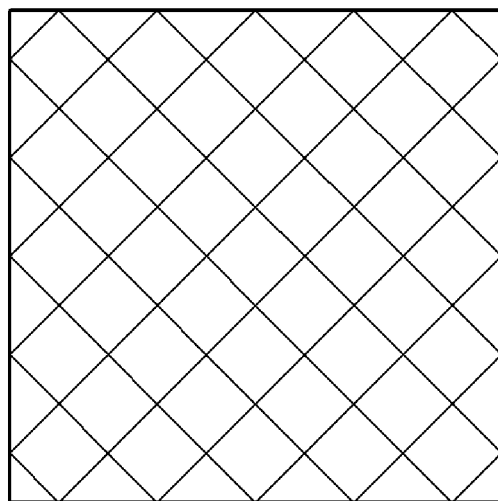
FIGS. 5A, 5B, 5C, and 5D show various modifications of the mesh pattern shown in FIG. 4.
Figure 5B:
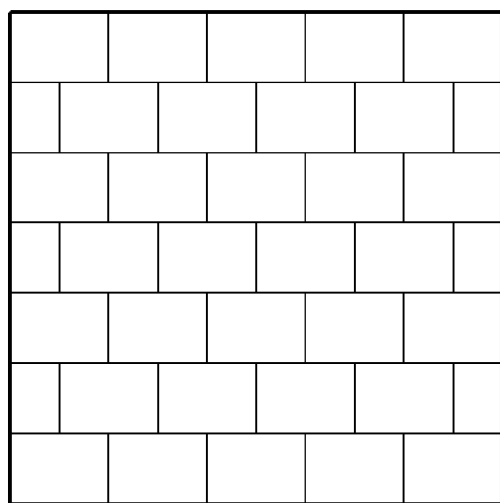
Figure 5C:
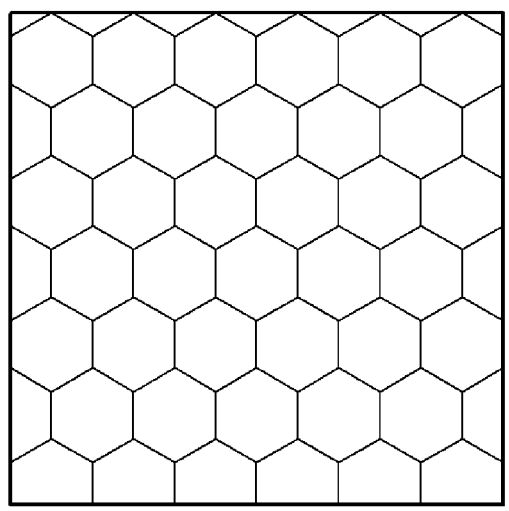
Figure 5D:
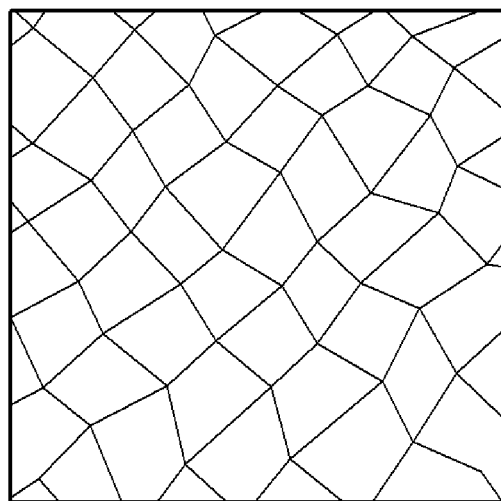
Figure 6:
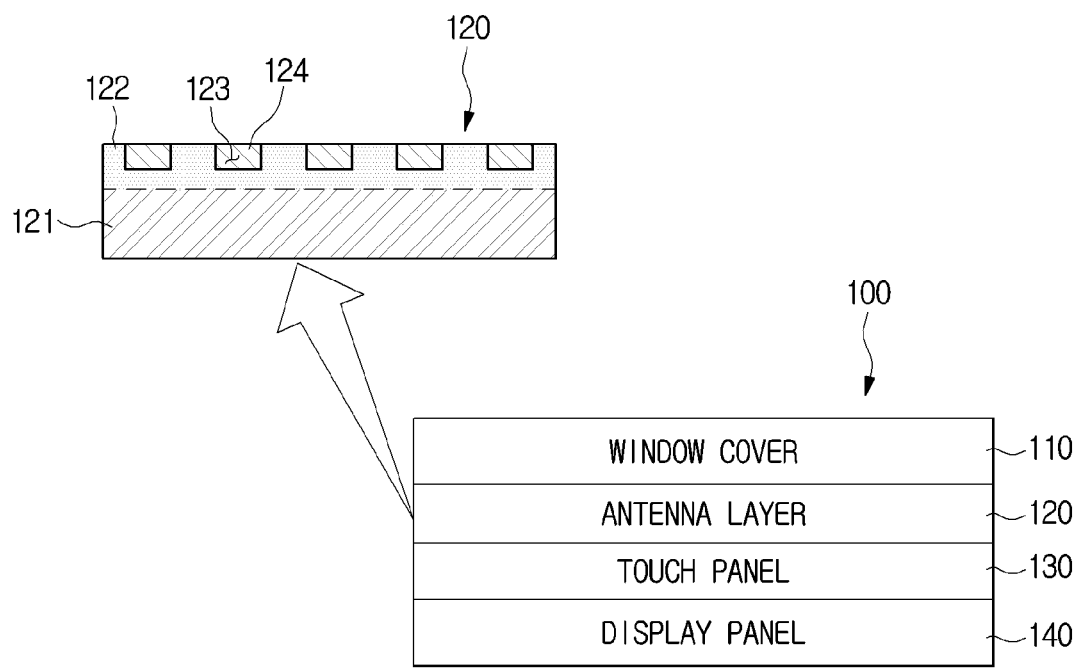
FIG. 6 is a cross-sectional view of the antenna layer shown in FIG. 4, cut along a line B-B'.

FIG. 4 shows an example of a mesh pattern formed in the antenna layer 120 according to an embodiment of the present disclosure, FIG. 5 shows various modifications of the mesh pattern shown in FIG. 4, and FIG. 6 is a cross-sectional view of the antenna layer 120 shown in FIG. 4, cut along a line B-B'.

Referring to FIG. 4, the antenna layer 120 may be formed in a mesh pattern. The display module 100 may include the antenna layer 120 formed in the mesh pattern in order to ensure visibility.

The mesh pattern may be, as shown in FIG. 4, a pattern in which a plurality of diamond- or square-shaped patterns are uniformly arranged, wherein when $\theta 1 < \theta 2$, $1° < \theta 1 < 89°$ in order to provide an optimal angle allowing Moiré avoidance according to display characteristics. However, the mesh pattern is not limited to the pattern shown in FIG. 4, and various modifications are possible.

As shown in FIG. 5, the mesh pattern may be a pattern in which a plurality of square-shaped patterns are uniformly arranged, as shown in FIG. 5A, a pattern in which a plurality of square- or rectangle-shaped patterns are uniformly arranged, as shown in FIG. 5B, a pattern in which a plurality of hexagon-shaped patterns are uniformly arranged, as shown in FIG. 5C, or a non-uniform pattern in which a plurality of random polygon shapes are arranged, as shown in FIG. 5D. In the following description, for convenience of description, the mesh pattern is assumed to be the pattern shown in FIG. 4.

As shown in FIG. 6, the antenna layer 120 may include a substrate 121, and a resin layer 122 formed by an imprinting method. The resin layer 122 may include, in its one surface, a plurality of engraved patterns, or groove, 123 (123 for each) and an ink layer 124 formed by filling a conductive material in the engraved patterns 123. The engraved patterns 123 may be formed in a mesh pattern as described above, and accordingly, the ink layer 124 may also be formed in a mesh pattern to correspond to the engraved patterns 123. The ink layer 124 may function as an electrode structure because it is formed with a conductive material. The conductive material will be described later.

The transmission and reception performance of the antenna layer 120 included in the display module 100 may depend on a structure of the engraved patterns 123 formed in the substrate 121, more specifically, the ink layer 124 formed to correspond to the engraved patterns 123. In more detail, as the engraved patterns 123 have narrower widths and deeper depths, the antenna layer 120 may have better transmission and reception performance. Also, as intervals between the engraved patterns 123, that is, the lengths of pitches are shorter, the transmission and reception performance of the antenna layer 120 may be improved. However, because transmission and reception performance of the antenna layer 120 and visibility of the display module 100 are in a trade-off relationship, the width, depth, and pitch of the engraved patterns 123 are adjusted appropriately.

Hereinafter, a relationship between a structure of the mesh pattern and transmission and reception performance of the antenna layer 120 will be described in more detail.

Figure 7:
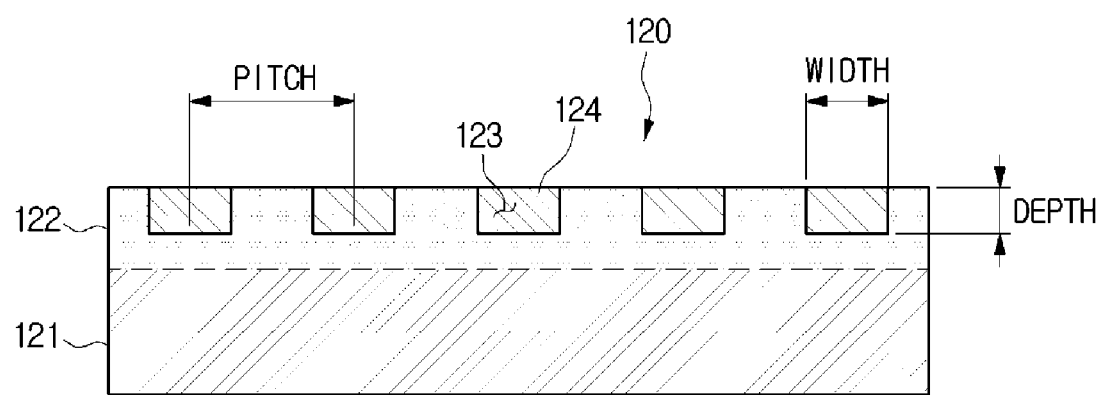
FIG. 7 is a view for describing a relationship between the shape of a mesh pattern and transmission and reception performance of an antenna layer.

FIG. 7 is a view for describing a relationship between the shape of the mesh pattern and transmission and reception performance of the antenna layer 120.

Referring to FIG. 7, the width of an engraved pattern 123 is defined as a width W, the thickness of an engraved pattern 123 is defined as a depth D, and an interval between two neighboring engraved patterns 123 is defined as a pitch P. According to an embodiment, when a plurality of patterns under different pattern regulations are combined to form a mesh pattern, an interval between pattern groups under the different pattern regulations is defined as a pitch, and when a plurality of diamond-shaped patterns are combined to form a mesh pattern, a straight distance between two neighboring patterns is defined as a pitch.

Meanwhile, a height to width ratio is defined as an aspect ratio. Generally, if an aspect ratio is high, it is possible to improve conductivity due to an increase of the cross-sectional areas of conductors, while minimizing a reduction rate of visibility of the display. However, if an aspect ratio is excessively high, it may be difficult to ensure visibility due to a poor viewing angle. Accordingly, an aspect ratio is appropriately adjusted in consideration of both visibility and conductivity.

Each pattern included in the antenna layer 120 may have a width in a range of approximately 1 μm to approximately 10 μm. Generally, if the width of a pattern is below 1.8 μm, it is difficult to recognize the pattern with a human's naked eyes. Accordingly, by reducing the widths of the patterns, visibility of the display module 100 can be improved. However, if the widths of the patterns are excessively reduced, the metal mesh structure may fail to ensure conductivity due to a decrease of the cross-sectional areas of the conductors. Accordingly, a lower limit on the widths of the patterns may be set to 1 μm or more.

According to an embodiment, if the widths of the patterns are wide, an advantage may be acquired in view of conductivity of the ink layer 124, which may lead to ensuring transmission and reception performance of the antenna layer 120. However, if the widths of the patterns are excessively wide, a user can see the patterns with his/her naked eyes, which may lead to failing to ensure visibility of the display module 100. Accordingly, an upper limit on the widths of the patterns may be set to 10 μm or less.

Each pattern may have a depth in a range of approximately 1 μm to approximately 18.5 μm. Generally, if a depth to width ratio of a pattern is great, an advantage can be obtained in view of visibility. For example, comparing a case in which the width of a pattern is 2 μm and the depth of the pattern is 4 μm to a case in which the width of a pattern is 4 μm and the depth of the pattern is 2 μm, the former case shows higher visibility than the latter case, while the two cases show the same conductivity. This is because a pattern area that a human's naked eyes can recognize is small. Accordingly, the depths of patterns may be adjusted in consideration of the widths of the patterns.

Meanwhile, if an aspect ratio of the patterns is excessively great, a viewing angle may be limited due to the deep depths of the patterns. Accordingly, the depths of the patterns may be set to 18.5 μm or less.

The patterns may have a pitch in a range of approximately 50 μm to approximately 250 μm. If the length of the pitch is short, a density of metal per unit area may increase to improve conductivity of the electrode structure. However, if the length of the pitch is excessively short, visibility may deteriorate. Accordingly, a lower limit on the pitch may be set to 50 μm or more.

Meanwhile, if the length of the pitch is excessively long, density of metal per unit area may decrease to make ensuring conductivity of the electrode structure difficult. Accordingly, an upper limit on the pitch may be set to 250 μm or less.

Hereinafter, a relationship between the structure of the mesh pattern and transmission and reception performance of the antenna layer 120 will be described with reference to experimental data.

Resistance values of the antenna layer 120 according to various structures of the mesh pattern are shown in Table 1, below.

TABLE 1

| Sample | Width (μm) | Depth (μm) | Pitch (μm) | Resistance (Ω) |
|---|---|---|---|---|
| Sample 1 | 5.2 | 4.5 | 196 | 9.73 |
| Sample 2 | 5.2 | 4.5 | 160 | 8.09 |
| Sample 3 | 5.2 | 4.5 | 130 | 6.84 |
| Sample 4 | 5.2 | 4.5 | 98 | 4.95 |
| Sample 5 | 3.4 | 6.4 | 90 | 4.7 |
| Sample 6 | 3.7 | 6.4 | 110 | 5.3 |
| Sample 7 | 3.9 | 6.1 | 130 | 6.2 |
| Sample 8 | 4.2 | 6.3 | 130 | 5.6 |

Resistance values shown in Table 1 are resistance values measured on Samples 1 to 8 each having a size of 4*60 mm in which mesh patterns having widths, depths, and pitches as shown in Table 1 are respectively formed.

Comparing Samples 1 to 4 to each other, it can be seen that if the lengths of the pitches are shortened from 196 μm to 98 μm when the widths and depths of the mesh patterns are 5.2 μm and 4.5 μm, respectively, the resistance values of Samples 1 to 4 are reduced from 9.73Ω to 4.95Ω. That is, as the length of a pitch is shortened, electrical conductivity of the antenna layer 120 can be improved.

Comparing Samples 3, 7, and 8 to each other, it can be seen that if the widths of the mesh patterns are reduced from 5.2 μm to 4.2 μm and the depths of the mesh patterns increase from 4.5 μm to 6.3 μm when the pitches of the mesh patterns are the same as 130 μm, the resistance values of Samples 3, 7, and 8 are reduced from 6.84Ω to 5.6Ω. That is, as the width of a mesh pattern is reduced and the depth of the mesh pattern increases, electrical conductivity of the antenna layer 120 can be improved.

The structure of the antenna layer 120 has been described above.

The antenna layer 120 may be disposed between the window cover 110 and the touch panel 130 of the display module 100. However, the antenna layer 120 of the display module 100 may be disposed at another position than between the window cover 110 and the touch panel 130, according to an embodiment.

Figure 8:
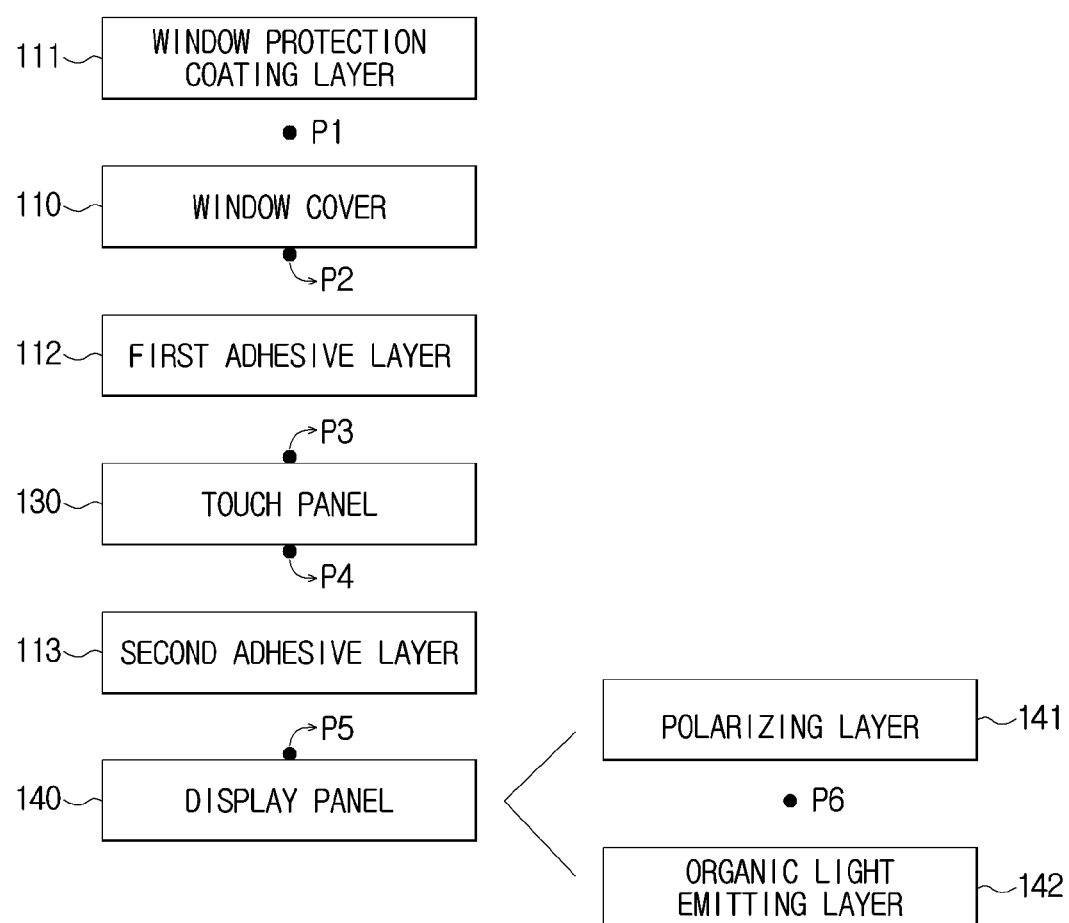
FIG. 8 shows a detailed structure of a display module according to an embodiment of the present disclosure, and various arrangement examples of an antenna layer included in the display module.

FIG. 8 shows a detailed structure of the display module 100 according to an embodiment of the present disclosure, and various arrangement examples of the antenna layer 120 included in the display module 100.

Referring to FIG. 8, the display module 100 according to an embodiment of the present disclosure may include a window protection coating layer 111 and a plurality of adhesive layers 112 and 113, in addition to the components shown in FIGS. 3A and 3B.

The window protection coating layer 111 may be formed on the window cover 110 to protect the window cover 110. Also, the first and second adhesive layers 112 and 113 may be disposed between the window cover 110 and the touch panel 130 and between the touch panel 130 and the display panel 140, respectively. The first and second adhesive layers 112 and 113 may be provided between the individual layers to facilitate attachment of the layers while isolating the layers. The first and second adhesive layers 112 and 113 may include an Optical Clear Adhesive (OCA) film, although the disclosure is not limited to this.

The antenna layer 120 may be disposed between the individual layers shown in FIG. 8. More specifically, the antenna layer 120 may be disposed between the window protection coating layer 111 and the window cover 110 (P1), between the window cover 110 and the first adhesive layer 112 (P2), between the first adhesive layer 112 and the touch panel 130 (P3), between the touch panel 130 and the second adhesive layer 113 (P4), or between the second adhesive layer 113 and the display panel 140 (P5).

According to an embodiment, if the display panel 140 is an OLED type, the display panel 140 may include a polarizing film 141 and an organic light emitting layer 142. In this case, the antenna layer 120 may be also disposed between the polarizing film 141 and the organic light emitting layer 142 (P6).

When the antenna layer 120 is disposed at each position P1 to P6, the antenna layer 120 may be positioned such that the mesh pattern formed on one surface of the substrate is toward the front or back surface of the display module 100.

The antenna layer 120 may be provided as a separate layer, as described above with reference to FIGS. 1 to 6. However, according to an embodiment, the antenna layer 120 may be formed directly on one surface of a component that is basically provided to the display module 100. For example, a conductive ink may be coated on one surface of the window cover 110 to provide a conductive pattern in the form of a thin film without having to insert any additional component, which may contribute to slimming of the electronic device 1. Hereinafter, a layered structure of a display module according to an embodiment of the present disclosure will be described with reference to the appended drawings.

Figure 9:
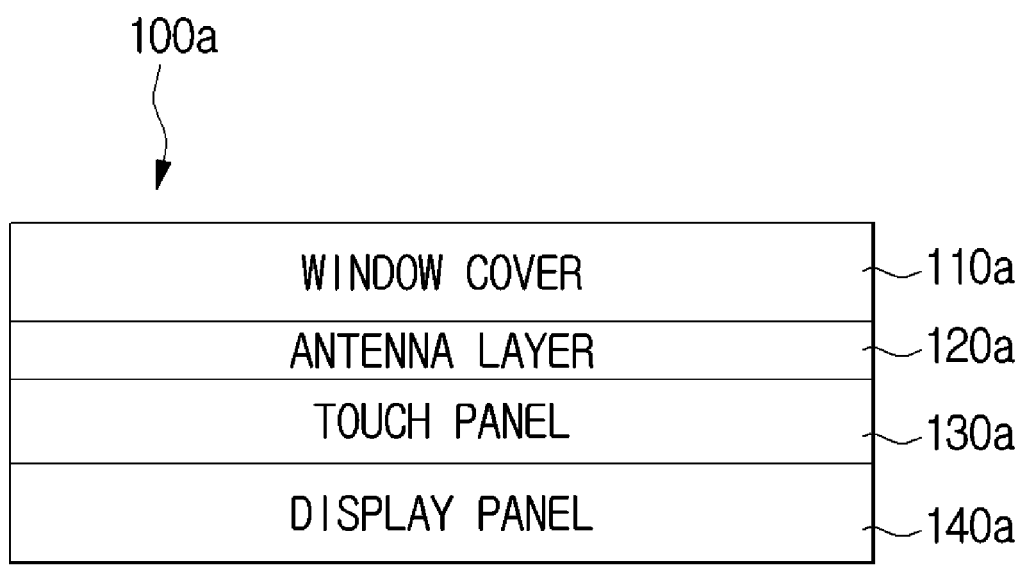
FIG. 9 shows a layered structure of a display module according to an embodiment of the present disclosure.

FIG. 9 shows a layered structure of a display module according to an embodiment of the present disclosure.

Referring to FIG. 9, a display module 100a according to an embodiment of the present disclosure may include a window cover 110a, an antenna layer 120a, a touch panel 130a, and a display panel 140a. The window cover 110a, the touch panel 130a, and the display panel 140a may be substantially the same as the window cover 110, the touch panel 130, and the display panel 140 shown in FIGS. 3A and 3B, and accordingly, further descriptions thereof will be omitted.

The antenna layer 120a may be formed in a mesh pattern, like the antenna layer 120 shown in FIGS. 4 and 5, by an imprinting method. More specifically, the antenna layer 120a may be formed directly on one surface of the window cover 110a, which may lead to slimming of the display module 100a.

According to some embodiments, the antenna layer 120a may be formed on a layer other than the window cover 110a.

Figure 10:
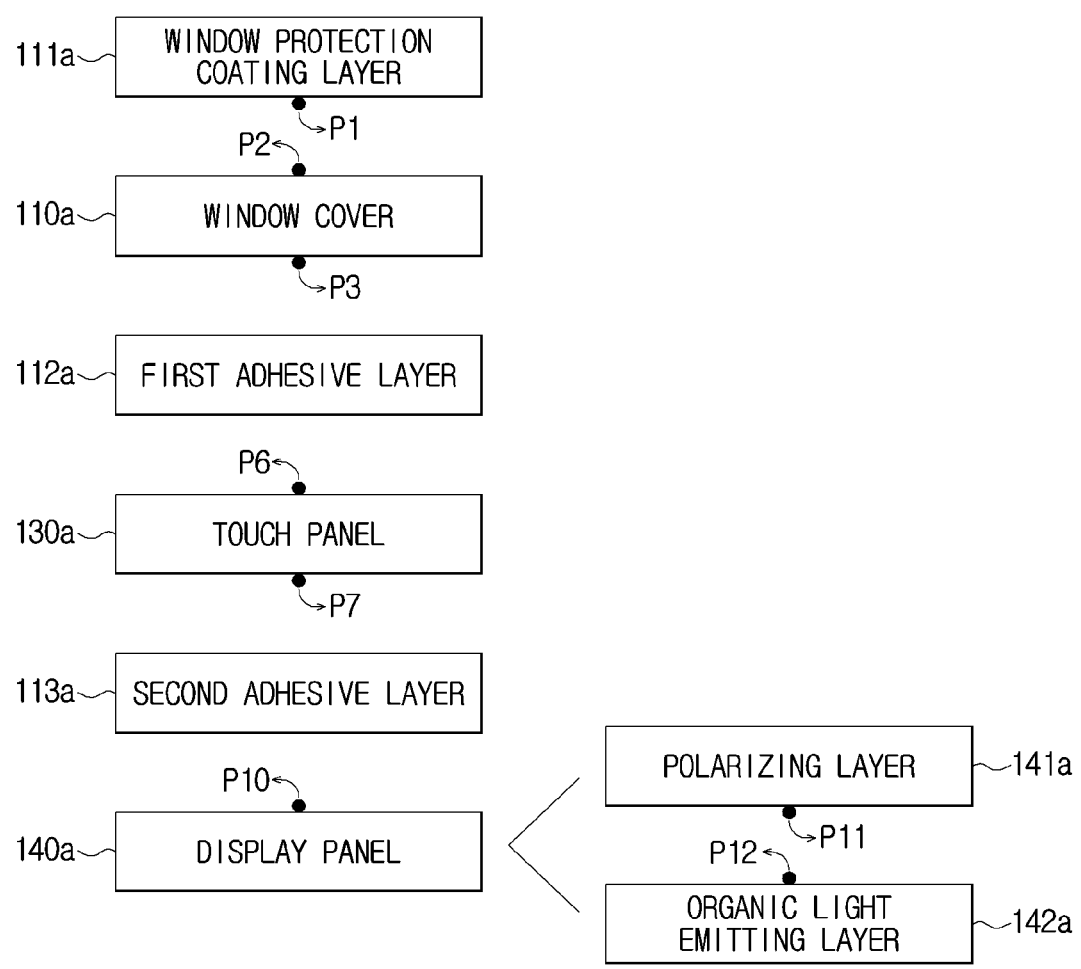
FIG. 10 shows a detailed structure of a display module according to an embodiment of the present disclosure, and various formation examples of an antenna layer included in the display module.

FIG. 10 shows a detailed structure of the display module 100a according to an embodiment of the present disclosure, and various formation examples of the antenna layer 120a included in the display module 100a.

Referring to FIG. 10, the display module 100a may include a window protection coating layer 111a and a plurality of adhesive layers (that is, a first adhesive layer 112a and a second adhesive layer 113a), in addition to the components shown in FIG. 9. More specifically, the display module 100a may have a structure in which the display panel 140a, the second adhesive layer 113a, the touch panel 130a, the first adhesive layer 112a, the window cover 110a, and the window protecting coating layer 111a are stacked in this order.

The antenna layer 120a may be formed on one surface of each layer shown in FIG. 10. More specifically, the antenna layer 120a may be formed on the rear surface of the window protection coating layer 111a (P1), on the front surface of the window cover 110a (P2), on the rear surface of the window cover 110a (P3), on the front surface of the touch panel 130a (P6), on the rear surface of the touch panel 130a (P7), or on the front surface of the display panel 140a (P10).

According to an embodiment, if the display panel 140a is an OLED type, the display panel 140a may include a polarizing film 141a and an organic light emitting layer 142a. In this case, the antenna layer 120a may be also formed on one surface of the polarizing film 141a or the organic light emitting layer 142a (P11 and P12).

Examples in which the antenna layer 120 or 120a is disposed (formed) in the display module 100 or 100a according to the embodiment of the present disclosure have been described above.

The antenna layer 120 or 120a may be formed with a transparent, conductive material in order to ensure visibility of the display module 100 or 100a. The transparent, conductive material may be a conductive ink having low resistance in order to ensure transmission and reception performance of an antenna.

Transparency and transmission and reception performance of the antenna layer 120 or 120a may depend on a mixing proportion of the conductive ink used to form the antenna layer 120 or 120a, a kind of conductive particles included in the conductive ink, etc. Hereinafter, the conductive ink used to form the antenna layer 120 or 120a will be described in detail.

The conductive ink according to an embodiment of the present disclosure may contain the same kind of conductive particles. The same kind of conductive particles may have the same size. However, according to an embodiment, the same kind of conductive particles may have different sizes and shapes.

Figure 11:
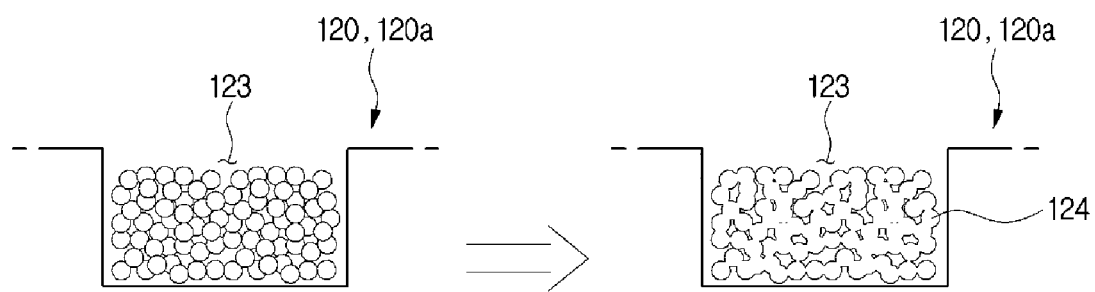
FIG. 11 shows an example in which conductive particles of the same size are provided.
Figure 12:
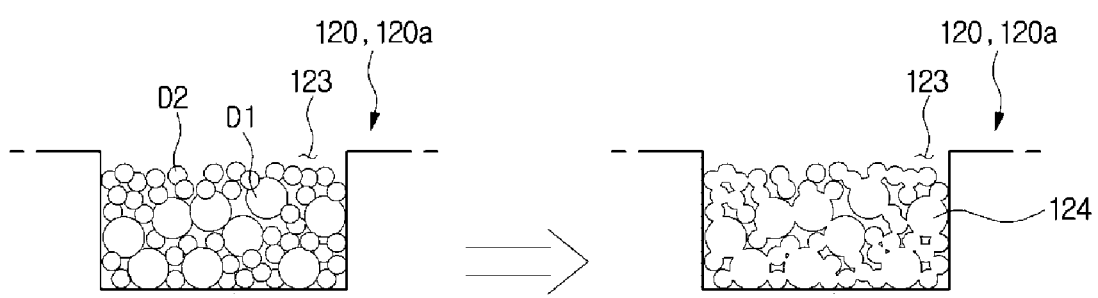
FIG. 12 shows an example in which conductive particles of different sizes are provided.
Figure 13:
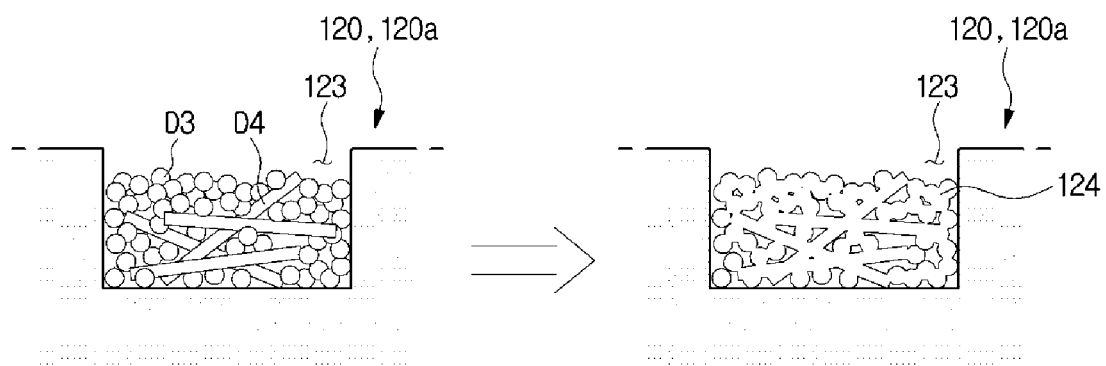
FIG. 13 shows an example in which conductive particles of different sizes and shapes are provided.

FIG. 11 shows an example in which conductive particles of the same size are provided, FIG. 12 shows an example in which conductive particles of different sizes are provided, and FIG. 13 shows an example in which conductive particles of different sizes and shapes are provided.

In FIGS. 11, 12, and 13, the left drawings show states in which a conductive ink is filled in an engraved pattern 123, and the right drawings show states in which conductive particles are connected due to heat generated by post-processing of applying heat, light, or pressure to the conductive ink, or due to heat generated by resistance of the conductive particles when power is supplied to the conductive particles.

As shown in FIG. 11, the conductive ink may contain conductive particles of the same size. Generally, as the size of conductive particles is great, contact points are reduced to reduce conductivity, and as the size of conductive particles is small, surface resistance increases to reduce conductivity. Accordingly, the conductive ink according to the current embodiment may contain conductive particles of the same size.

The conductive particles may melt at different temperatures according to their sizes. Because the conductive ink according to the current embodiment contains conductive particles of the same size, it is easy to adjust a melting temperature of the conductive particles. Accordingly, if the conductive ink according to the current embodiment is used in a process of manufacturing the antenna layer 120 or 120a, it may be easy to adjust a melting temperature of the conductive ink when the conductive ink was hardened.

As shown in FIG. 12, the conductive ink may contain first particles D1 and second particles D2, wherein the size of the first particles D1 may be different from that of the second particles D2. More specifically, a mean particle size of the first particles D1 may be greater than that of the second particles D2. According to an embodiment, a mean particle size of the first particles D1 may be 1 to 1500 times greater than that of the second particles D2. However, the mean particle sizes of the first particles D1 and the second particle D2 are not limited to the above-mentioned value range.

As shown in FIG. 12, because the conductive ink contains conductive particles of different sizes, the conductive ink may have different mean particle sizes per unit distance. As a result, the conductive ink can be filled with high density in a target area (for example, in the engraved pattern 123).

Also, by filling the first particles D1 having the greater mean particle size per unit distance, electrical contact resistance may be reduced, and as a result, conductivity of the antenna layer 120 or 120a may be improved due to an ink layer 124 resulting from hardening of the conductive ink. Also, the second particles D2 having the smaller size may be filled between the first particles D1 having the greater size to increase density of metal.

Also, the first and second particles D1 and D2 may have nano sizes. However, the sizes and shapes of the first and second particles D1 and D2 are not limited to nano sizes, and the first and second particles D1 and D2 may have sizes of several hundreds of picometers to several hundreds of micrometers.

As shown in FIG. 13, the conductive ink may contain third particles D3 and fourth particles D4, wherein the shape of the third particles D3 may be different from that of the fourth particles D4. The third particles D3 may be in the shape of nano dots, and the fourth particles D4 may be in the shape of nano rods. Unlike the nano dots that are point-to-point coupled, the nano rods may allow electrical conduction to a relatively long distance due to a high aspect ratio. Accordingly, contact resistance at contact areas between the particles may be reduced, and as a result, conductivity of the antenna layer 120 or 120a can be improved by the ink layer 124 resulting from hardening of the conductive ink.

According to an embodiment, the conductive ink may contain conductive particles in the shape of nano dots, and a metallic complex compound. In this case, after the conductive ink is dried, the metallic complex compound may resolve into a metal to surround the nano dots, which reduces contact resistance between the nano dots to thereby improve conductivity.

The conductive particles may include particles for low temperature and particles for high temperature. More specifically, the particles for low temperature may be at least one selected from a group including silver (Ag), copper (Cu), and Nickel (Ni), and the particles for high temperature may be at least one selected from a group including a silver (Ag)-lead (Pb) alloy, gold (Au), a gold (Au)-platinum (Pt) alloy, a gold (Au)-lead (Pb) alloy, a copper (Cu)-Nickel (Ni) alloy, and tungsten (W). However, the conductive particles are not limited to the above-mentioned examples.

Meanwhile, if the antenna layer 120 or 120a is formed with a polished metal material, light incident from the outside or image light output from the display panel may be reflected from the antenna layer 120 or 120a, which may deteriorate a contrast ratio.

For this reason, in the display module 100 or 100a according to the embodiment of the present disclosure, a blackened layer may be formed on the surface of the antenna layer 120 or 120a in order to suppress reflection of light incident from the outside.

The blackened layer may be formed by including a blackening material in a conductive ink provided to form the antenna layer 120 or 120a. Hereinafter, a case in which a blackening material is included in a conductive ink will be described in detail.

The conductive ink according to an embodiment of the present disclosure may further include a blackened material, in addition to the conductive particles described above. The blackened material may be added in powder form in the conductive ink. In the following description, the blackened material added in powder form will be referred to as blackened particles.

The conductive ink may include approximately 10 to approximately 75 parts of weight of a solvent and approximately 25 to approximately 90 parts of weight of a solid with respect to the entire weight of the conductive ink, and the solid may include approximately 80 to approximately 99 parts of weight of conductive particles and approximately 1 to approximately 20 parts of weight of blackened particles with respect to the entire weight of the solid. In other words, the conductive ink may include approximately 10 to approximately 75 parts of weight of a solvent, approximately 40 to approximately 89.1 parts of weight of conductive particles, and approximately 0.5 to approximately 18 parts of weight of blackened particles with respect to the entire weight of the conductive ink.

The conductive particles may include, as described above, particles for low temperature and particles for high temperature. Hereinafter, repetitive descriptions about the kinds of the conductive particles will be omitted.

The blackened particles may be at least one selected from a group including carbon black, graphite, carbon nanotube, polyacetylene, polypyrrole, polyaniline, and polythiophene.

The blackened particles may be included at an appropriate proportion in the conductive ink. More specifically, if a small amount of the blackened material is included in the conductive ink, light incident from the outside may be reflected from the surface of the antenna layer 120 or 120a, which may make ensuring visibility difficult. Meanwhile, if a large amount of the blackened material is included in the conductive ink, a proportion of the conductive particles in the conductive ink may be relatively lowered, which may make ensuring conductivity difficult. Accordingly, a proportion of the blackened material is appropriately adjusted in the conductive ink.

The blackened particles may have a lower specific gravity than the conductive particles. According to an embodiment, the blackened particles may be graphite particles having a specific gravity of approximately 1.6. The conductive particles may be silver (Ag) particles having a specific gravity of approximately 10.49, gold (Au) particles having a specific gravity of approximately 19.29, lead (Pb) particles having a specific gravity of approximately 11.34, copper (Cu) particles having a specific gravity of approximately 8.93, nickel (Ni) particles having a specific gravity of approximately 8.9, or platinum (Pt) particles having a specific gravity of approximately 21.45.

As a result, a density of the conductive particles may be within a range of approximately 0.1 to approximately 20 g/cm$^3$, and may be within a range of approximately 2.7 to approximately 20 g/cm$^3$. Also, a density of the blackened particles may be within a range of approximately 0.1 to approximately 1.5 g/cm$^3$.

Figure 14:
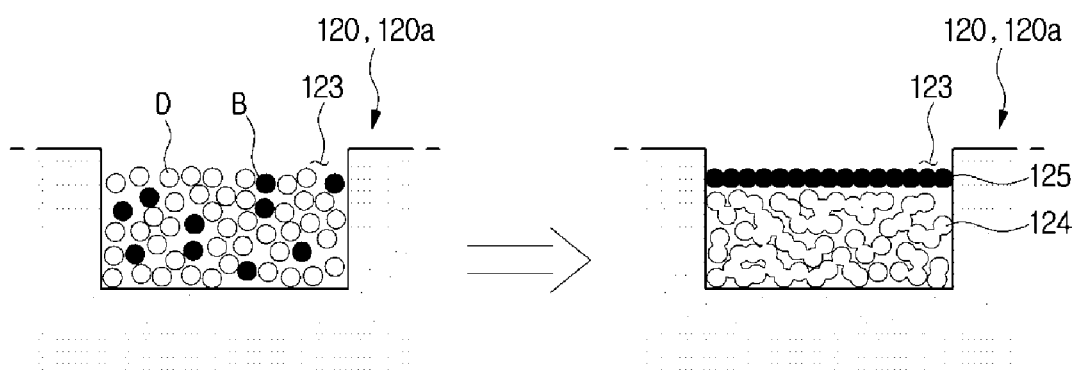
FIG. 14 is a view for describing a blackening process according to an embodiment of the present disclosure.

In the antenna layer 120 or 120a according to the embodiment of the present disclosure, a blackened layer may be formed on the surface of the ink layer 124 due to a specific gravity difference between the conductive particles and the blackened particles. FIG. 14 is a view for describing a blackening process according to an embodiment of the present disclosure.

As shown in FIG. 14, when the conductive ink is filled in the engraved pattern 123 formed by an imprinting method, the conductive particles D having a relatively high specific gravity may sink to the lower part of the engraved pattern

123 by gravity, and the blackened particles B having a relatively low specific gravity may float on the upper part of the engraved pattern 123.

In this state, if the conductive ink is hardened, the blackened particles B positioned above the conductive particles D may be hardened to form the blackened layer 125 on the surface of an ink layer 125. In this way, the surface of the antenna layer 120 or 120a can be blackened by a single process.

The blackened particles B and the conductive particles D may have the same size. However, according to an embodiment, the blackened particles B and the conductive particles D may have different sizes. Also, the conductive particles D may have the same size or different sizes. Hereinafter, repetitive descriptions about those described above with reference to FIGS. 11 to 13 will be omitted.

Meanwhile, the conductive ink may further include a binder and an additive.

The binder may be used to facilitate close contacts between the conductive particles D. The binder may be at least one selected from a group including phenol, acryl, urethane, epoxy, melamine, glass frit, and fluorosilicate. More specifically, if conductive particles for low temperature are a main part of the conductive ink, a binder, such as phenol, acryl, urethane, epoxy, and melamine, may be used, and if conductive particles for high temperature are a main part of the conductive ink, a binder, such as glass frit and fluorosilicate, may be used.

The additive may be added to disperse particles or improve printing quality. The additive may be at least one selected from a group including 4000 series of EFKA, Disprebyk series of BYK, Solsperse series of Avecia, TEGO Disperse series of Deguessa, Disperse-AYD series of Elementis, JONCRYL series of Johnson Polymer, Ethyl Cellulose, and Acryl. However, the additive is not limited to the above-mentioned materials.

The structure of the display module 100 or 100a according to the embodiment of the present disclosure has been described above.

Hereinafter, a method of manufacturing the display module 100 or 100a will be described.

Figure 15:
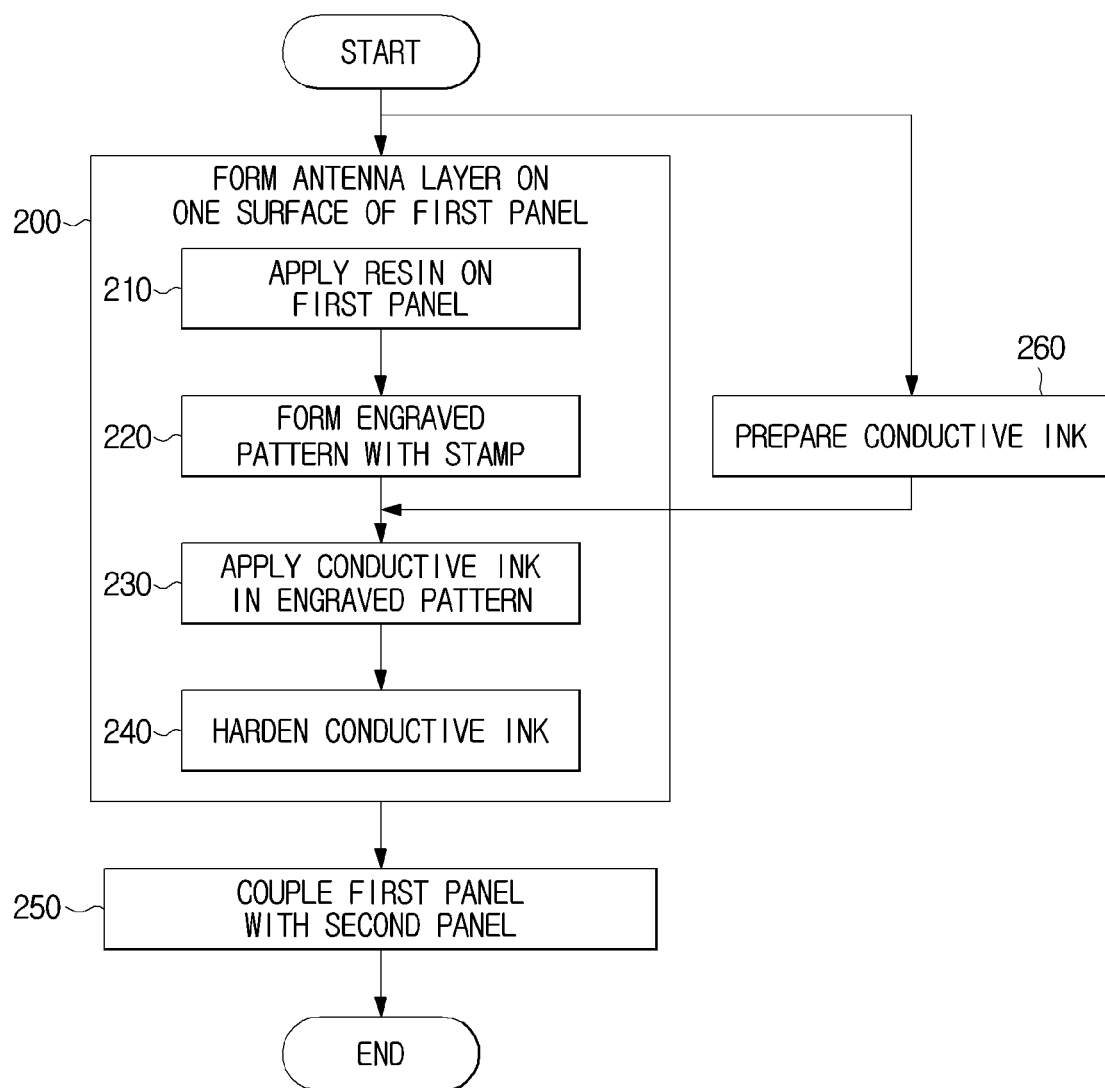
FIG. 15 is a flowchart illustrating a method of manufacturing a display module according to an embodiment of the present disclosure.
Figure 16:
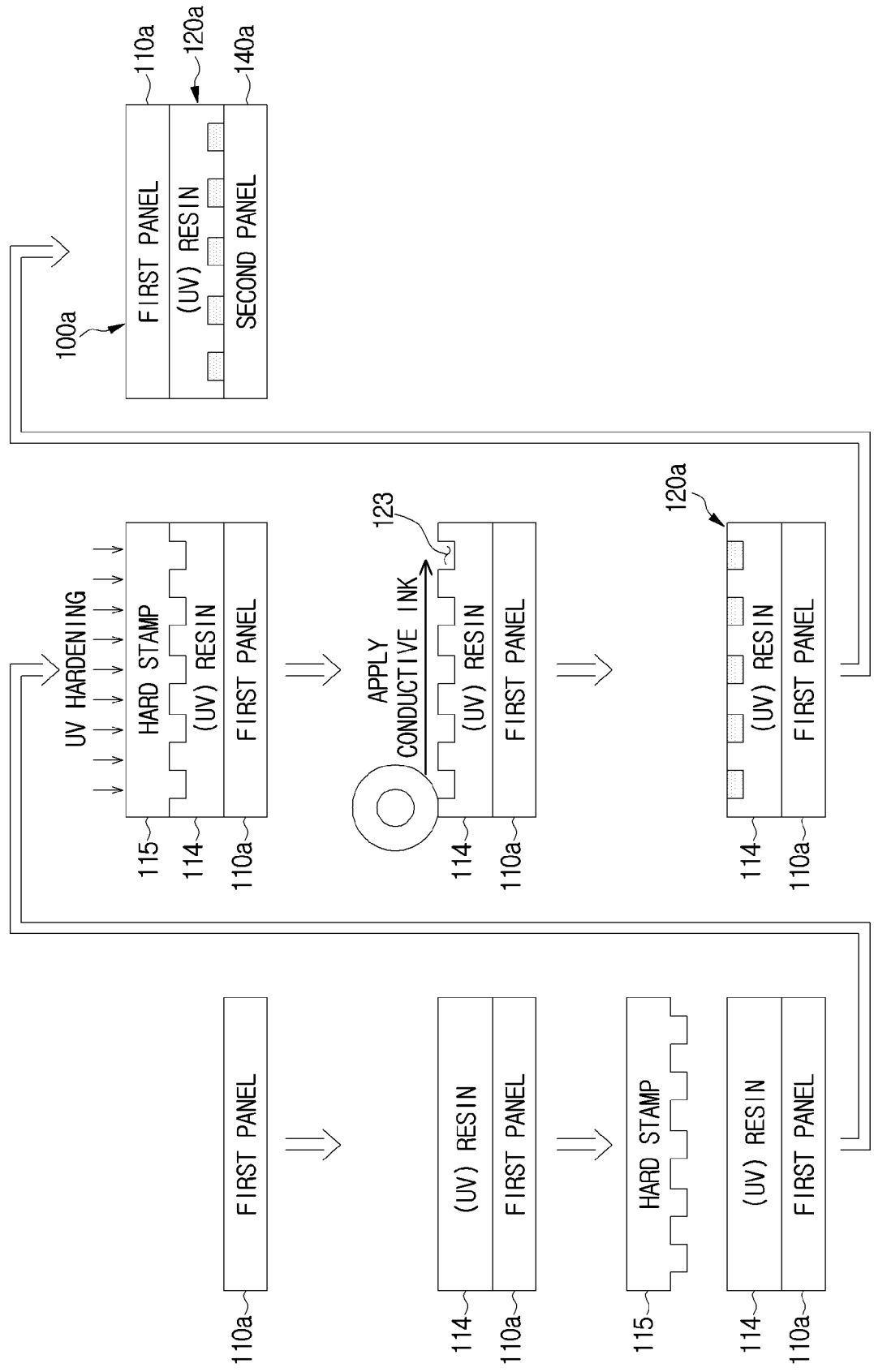
FIG. 16 is a schematic view for describing the manufacturing method of FIG. 15.

FIG. 15 is a flowchart illustrating a method of manufacturing a display module according to an embodiment of the present disclosure, and FIG. 16 is a schematic view for describing the manufacturing method of FIG. 15.

Hereinafter, for convenience of description, on the assumption that the display module includes a first panel and a second panel, and the antenna layer 120a is formed on one surface of the first panel (see the structure of the display module 100a shown in FIGS. 9 and 10), a method of manufacturing the display module 100a will be described.

Referring to FIGS. 15 and 16, the method of manufacturing the display module 100a according to an embodiment of the present disclosure may include operation 200 of forming the antenna layer 120a on one surface of the first panel by an imprinting method, and operation 250 of coupling the first panel with the second panel.

The first panel and the second panel may include the window cover 110a, the touch panel 130a, and the display panel 140a. According to some embodiments, the first panel and the second panel may include, in addition to the window cover 110a, the touch panel 130a, and the display panel 140a, a separate substrate (for example, the window protection coating layer 111a, the polarizing layer 141a of the display panel 140a, or the organic light emitting layer 142a) or an adhesive layer 112a or 113a for making the above-mentioned panels adhere to each other. In the following description, the first panel is assumed to be the window cover 110a, and the second panel is assumed to be the display panel 140a.

Operation 200 of forming the antenna layer 120a on one surface of the first panel 110a by the imprinting method may include operation 210 of applying a resin 114 on the first panel 110a, operation 220 of pressing the applied resin 114 with a hard stamp 115 and then hardening the resin 114 to form an engraved pattern 123, operation 230 of applying a conductive ink in the engraved pattern 123, and operation 240 of hardening the conductive ink.

Operation 210 of applying the resin 114 on one surface of the first panel 110a may include applying the resin 114 on one surface of the window cover 110a.

The window cover 110a may be a transparent window cover having a predetermined transmittance. The window cover 110a may be glass having a uniform thickness and transmittance of a predetermined degree or more. Hereinafter, repetitive descriptions about the window cover 110a as described above with reference to FIG. 3 will be omitted.

The resin 114 may be a UV resin having predetermined viscosity, or a transparent, thermosetting resin. By applying the resin 114 on one surface of the window cover 110a, and flattening the resin 114 out with a blade having a predetermined width, a resin layer 114a having a uniform height and thickness may be formed. In the current embodiment, by applying the resin 114 directly on one surface of the window cover 110a, no additional member for forming the antenna layer 120a may be needed, which may lead to slimming of the electronic device 1.

Then, the applied resin 114 may be pressed with the hard stamp 115 to form the engraved pattern 123 (operation 220). Herein, the hard stamp 115 may be made of a polydimethylsiloxane (PDMS) material. In one surface of the hard stamp 115, a micropattern may be formed. By pressing the resin layer 114a with the hard stamp 115 having the micropattern at one surface, and then hardening the resin layer 114a, an engraved pattern corresponding to the micropattern may be formed on the resin layer 114.

The engraved pattern 123 may be in the form of a mesh pattern. According to an embodiment, the mesh pattern may be formed to correspond to the engraved pattern 123, and the mesh pattern may have a width of approximately 1 to approximately 10 μm, a depth of approximately 1 to approximately 18.5 μm, and a pitch of approximately 50 to approximately 250 μm. Accordingly, the engraved pattern 123 may be formed to be greater than the mesh pattern such that the mesh pattern has such a shape as described above.

Then, operation 230 of applying a conductive ink in the engraved pattern 123 may be performed. The conductive ink having predetermined transmittance and conductivity may be filled in the engraved pattern 123 to form an electrode pattern corresponding to the engraved pattern 123.

Before operation 230, operation 260 of preparing the conductive ink may be performed. The conductive ink may contain the same kind of conductive particles. The conductive particles may have the same size, or may have different sizes or shapes according to an embodiment. Hereinafter, repetitive descriptions about the conductive particles will be omitted.

The conductive particles may include particles for low temperature and particles for high temperature. More specifically, the particles for low temperature may be at least one selected from a group including silver (Ag), copper (Cu), and Nickel (Ni), and the particles for high temperature may be at least one selected from a group including a silver (Ag)-lead (Pb) alloy, gold (Au), a gold (Au)-platinum (Pt)

alloy, a gold (Au)-lead (Pb) alloy, a copper (Cu)-Nickel (Ni) alloy, and tungsten (W). However, the conductive particles are not limited to the above-mentioned examples.

By applying the conductive ink and then hardening the conductive ink, an electrode pattern may be formed on one surface of the window cover 110a, and the electrode pattern may function as the antenna layer 120a.

Then, the first panel 110a in whose one surface the antenna layer 120a is formed may be coupled with the second panel 140a (operation 250). The second panel 140a may be the display panel 140a as described above. More specifically, the second panel 140a may be at least one of LCD, a reflective display, an E-ink display, a PM OLED display, and an AM OLED display. However, the display panel 140a is not limited to the above-mentioned displays.

Because the display module according to an aspect includes a transparent antenna, it is possible to ensure improved transmission and reception performance.

Also, by forming the transparent antenna with a conductive ink containing conductive particles of different sizes, it is possible to improve conductivity of the antenna, and to ensure improved transmission and reception performance through noise reduction.

Also, by blackening the surface of the transparent antenna, it is possible to prevent reflection of light incident from the outside, and to ensure visibility of the electronic device (for example, a display device).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display module comprising:
   a window cover;
   a touch panel disposed on the window cover;
   an antenna layer imprinted on one surface of the touch panel, such that the antenna layer is disposed between the window cover and the touch panel; and
   a display panel disposed on another surface of the touch panel;
   wherein the antenna layer comprises a resin layer imprinted on the one surface of the touch panel, and the resin layer includes:
      at least one groove imprinted in the resin layer, and
      a conductive ink in the at least one groove, so that the resin layer having the at least one groove with the conductive ink therein, is disposed between the window cover and the touch panel.

2. The display module according to claim 1, wherein the at least one groove forms a mesh pattern.

3. The display module according to claim 1, wherein the antenna layer is transparent.

4. The display module according to claim 1, wherein the resin layer is formed by applying a resin on a touch panel, pressing the applied resin to form the at least one groove, and applying the conductive ink in the at least one groove.

5. The display module according to claim 1, wherein the conductive ink contains conductive particles, and a substantial portion of the conductive particles have at least one of different sizes and different shapes.

6. The display module according to claim 5, wherein the conductive ink further contains blackened particles.

7. The display module according to claim 5, wherein the blackened particles have a lower specific gravity than the conductive particles.

8. A display module comprising:
   a window cover;
   a window protection layer disposed on one surface of the window cover;
   an antenna layer imprinted on one surface of the window cover such that the antenna layer is disposed between the window cover and the window protection layer; and
   a touch panel disposed on another surface of the window cover;
   a display panel disposed on the touch panel;
   wherein the antenna layer comprises a resin layer imprinted on the one surface of the touch panel, and the resin layer includes:
      at least one groove imprinted on a surface of the resin layer, and
      a conductive ink in the at least one groove, so that the resin layer having the at least one groove with the conductive ink therein, is disposed between the window cover and the window protection layer.

9. The display module according to claim 8, wherein the at least one groove forms a mesh pattern.

10. The display module according to claim 8, wherein the antenna layer is transparent.

11. The display module according to claim 8, wherein the resin layer is formed by imprinting a resin on the window cover, pressing the applied resin to form the at least one groove, and applying the conductive ink in the at least one groove.

12. The display module according to claim 8, wherein the conductive ink contains conductive particles, and a substantial portion of the conductive particles have at least one of different sizes and different shapes.

13. The display module according to claim 12, wherein the conductive ink further contains blackened particles.

14. The display module according to claim 12, wherein the blackened particles have a lower specific gravity than the conductive particles.

15. A display module comprising:
    a window cover;
    a touch panel disposed on the window cover;
    a display panel disposed on one surface of the touch panel; and
    an antenna layer imprinted on the one surface of the touch panel such that the antenna layer is disposed between the touch panel and the display panel;
    wherein the antenna layer comprises a resin layer imprinted on the one surface of the touch panel, and the resin layer includes:
       at least one groove imprinted in the resin layer, and
       a conductive ink in the at least one groove, so that the resin layer having the at least one groove with the conductive ink therein, is disposed between the display panel and the touch panel.

16. The display module according to claim 15, wherein the at least one groove forms a mesh pattern.

17. The display module according to claim 15, wherein the antenna layer is transparent.

18. The display module according to claim 15, wherein the resin layer is formed by applying a resin on the touch panel, pressing the applied resin to form the at least one groove, and applying the conductive ink in the at least one groove.

19. The display module according to claim 15, wherein the conductive ink contains conductive particles, and a substantial portion of the conductive particles have at least one of different sizes and different shapes.

* * * * *